Patented Feb. 20, 1934

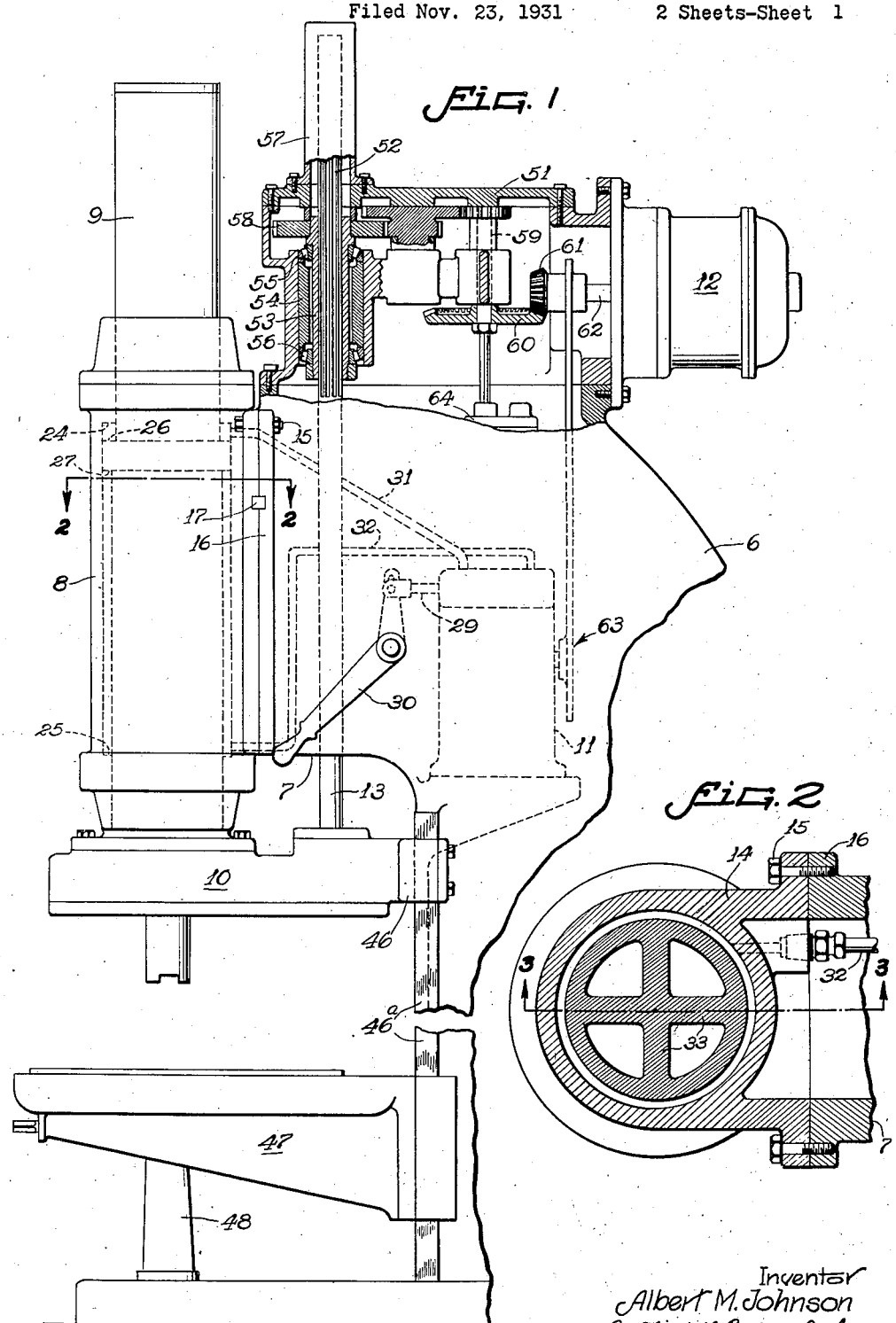

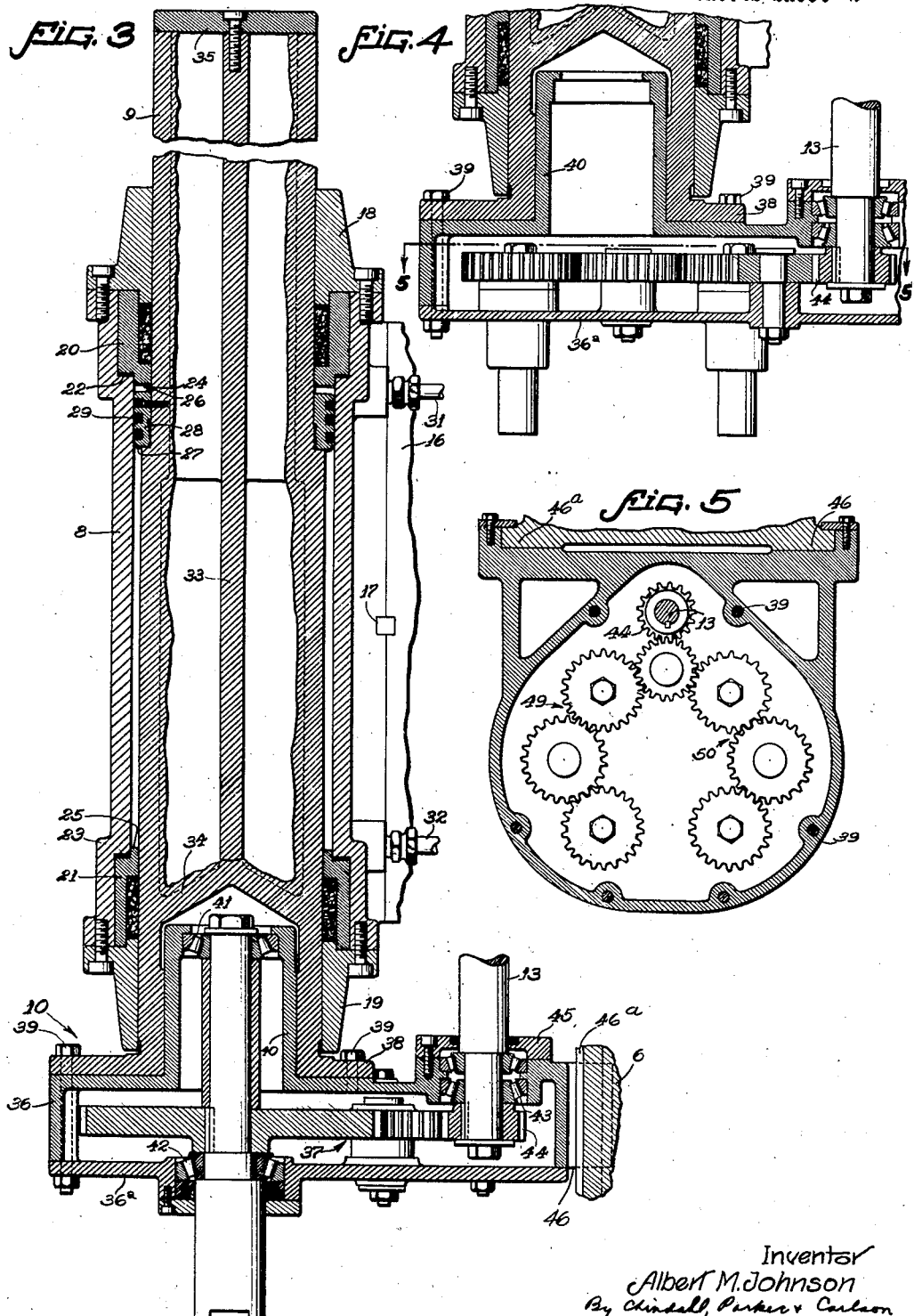

1,948,115

UNITED STATES PATENT OFFICE 1,948,115

MACHINE TOOL

Albert M. Johnson, Rockford, Ill., assignor to Barnes Drill Company, Rockford, Ill., a corporation of Illinois Application November 23, 1931
Serial No. 576,639

4 Claims. (Cl. 77—32)

The invention pertains to drilling machines and similar tools, and has for its general aim the provision of a tool of rugged construction, capable of being manufactured at a low cost and susceptible of being adapted readily to different classes of work.

With this aim in view, one object of the invention is to provide a machine tool having a fluid pressure feed mechanism with a reciprocatory element in the nature of a ram effectually guided in its movements and having the tool supporting head directly attached thereto and additionally guided on the stationary frame structure so as to be held rigidly against lateral strains.

Another object is to provide a tool of the character indicated, in which cylinders and rams of various sizes and tool heads of different kinds may be used interchangeably.

A further object is to provide a tool having a novel hydraulic feed means and separate spindle drive mechanism so constructed and arranged as to provide a strong and rugged guide means for the tool spindle together with maximum compactness.

The objects of the invention thus generally stated, together with other and ancillary advantages are obtained by the construction and arrangement shown by way of illustration in the accompanying drawings, in which:

Figure 1 is a fragmentary side elevational view of a drilling machine embodying the invention and showing in section a portion of the power-driven actuating mechanism.

Fig. 2 is a transverse fragmentary sectional view taken approximately in the plane of line 2—2 of Fig. 1 but on a somewhat larger scale.

Fig. 3 is a fragmentary vertical sectional view illustrating the construction of an hydraulic cylinder and ram with a single spindle head attached to the ram.

Fig. 4 is a fragmentary vertical sectional view showing a multiple spindle head attached to the ram.

Fig. 5 is a fragmentary horizontal sectional view taken approximately in the plane of line 5—5 of Fig. 4.

Referring first to Fig. 1, the machine, as illustrated, comprises a main supporting structure in the form of an upright column 6 having a forwardly projecting upper portion or head 7 to the front side of which is rigidly secured an upright elongated cylinder 8. A ram 9, with a tool spindle head 10 attached to its lower end, extends upwardly through the cylinder 8 and constitutes a reciprocatory feed member. Power for reciprocating the ram 9 is derived from a fluid pressure pump 11 having suitable valve controlled connections with the opposite ends of the cylinder 8 and actuated from a power-driven mechanism including an electric motor 12 mounted at the top of the column; and power is applied to the spindle head 10 for the rotation of one or more tools by means of a vertically reciprocatory drive shaft 13 extending upwardly from the head rearwardly of the cylinder 8 and also operatively connected with said drive mechanism.

The cylinder 8 and ram 9 are especially constructed so as to serve not only as the means for reciprocating the head but also as the means for guiding the head in such reciprocation. The cylinder is in the form of an elongated hollow cylindrical casting of large diameter having formed integral therewith rearwardly projecting flanged ribs 14 (Fig. 2) securely fastened by means of bolts 15 to flanges 16 on the forward side of the column head 7, a transverse key 17 being preferably provided between the parts to resist vertical shearing strains. Thus the cylinder is susceptible of easy application to as well as removal from the column, and thus it is possible to change readily from one size of cylinder to another when the nature of the work so requires.

Referring now to Fig. 3, the ram 9 consists of an elongated cylindrical member in the nature of a plunger, of a length substantially greater than the length of the cylinder 8 and extends entirely through the cylinder. Accordingly, the upper and lower ends of the cylinder are provided respectively with heads 18 and 19 bolted to the extreme ends of the cylinder and providing elongated bearing surfaces for the ram. To seal the opposite ends of the cylinder against the escape of oil or other fluid therefrom, the heads are equipped with packing glands 20 and 21, the ends of the cylinder being counterbored for this purpose so as to provide suitable gasketed seats 22 and 23 against which the glands are clamped. Thus, it will be seen that the ram is effectually guided at points spaced apart a substantial distance.

Between the glands the cylinder has a uniform internal diameter, while the inner end of the upper gland provides a fixed pressure area 24, and the inner end of the lower gland provides a fixed pressure area 25. The ram, on the other hand, has an external diameter somewhat less than the internal diameter of the cylinder and is provided with opposed pressure areas 26 and 27 respectively coacting with the fixed pressure areas 24 and 25 to effect reciprocation of the ram upon the introduction of fluid pressure to the opposite ends of the cylinder. Said opposed pressure areas 26 and 27 on the ram are provided in the present instance by means of a piston in the form of a sleeve 28 suitably secured to the ram and circumferentially grooved to receive the usual oil rings 29. In order to provide larger effective pressure areas for the downward or working structure of the ram, the upper end of the latter is of a smaller diameter than the lower portion thereof.

The pump 11 (Fig. 1) may be of any suitable or preferred character. Preferably it is enclosed within the upper portion of the column rearwardly of the cylinder and is equipped with a suitable valve having a stem 29 operable by a hand lever 30 on the outer side of the column to control selectively the flow of fluid under pressure to the opposite ends of the cylinder. For thus applying pressure fluid to the cylinder, pipe connections 31 and 32 are provided between the valve and the upper and lower ends of the cylinder respectively, the upper pipe communicating with the cylinder adjacent the upper fixed pressure area 24 and the lower pipe communicating with the cylinder adjacent the lower fixed pressure area 25.

It will be observed that by reason of the length and diameter of the cylinder 8 and of the ram 9, coupled with the rigid mounting of the cylinder on the column, an effectual guide means is provided for the tool spindle head carried by the lower end of the ram. In order further to lend strength and rigidity to the structure without unduly increasing the weight thereof, the ram, while made hollow, is provided with longitudinally extending reenforcing members such as webs 33 (Fig. 2). The latter terminate at their lower ends in a bottom closure plate 34 (Fig. 3) spaced inwardly from the lower end of the ram. The upper end of the ram may be closed by a cap plate 35.

The tool spindle head 10 comprises a relatively flat casing or gear box rigidly attached to the lower end of the ram and consisting of a main or top section in the form of a casting 36, and a rigid removable bottom plate 36ª. The head may be either of the single or multiple type. In Figs. 1 and 3, the spindle head is shown as having a single tool spindle axially alined with the ram and driven by gearing 37 from the lower end of the drive shaft 13. For the purpose of mounting the casing on the ram, the latter has a flange 38 cast integral with its lower end, to which flange the casing is rigidly secured as by bolts 39. Certain of the latter extend only through the top wall of the casing so as to retain the main portion of the casing in position when the bottom plate 36ª is removed.

To assist further in holding the spindle casing in proper position relative to the ram, the top wall of the casting 36 has a hollow cylindrical portion 40 forming an upright extension projecting into and fitting snugly within a recess in the lower end of the ram. It is to render the ram capable of receiving this portion 40 of the tool spindle casing that the reenforcing structure 33, 34 of the ram terminates short of the lower end thereof.

In cases where a single tool spindle is employed it is preferably supported in axial alinement with the ram, and spaced bearings provided therefor. Accordingly the single tool spindle shown in the present instance (Fig. 3) is provided with radial thrust bearings 41 and 42 mounted in the bottom plate 36ª of the casing and in the top of the cylindrical portion 40. The lower end of the drive shaft 13 is equipped with two sets of radial thrust bearings 43 arranged on the shaft in opposed relation between a pinion 44 forming part of the gearing 37 and a cap plate 45.

It will be observed that the gear box or casing is rigidly and removably secured to the lower end of the ram, with the plate 36ª in closely spaced relation to the nose of the ram, so that a rugged support is provided for the tool spindle. The ram in turn is effectually guided in its movements by the spaced bearings at opposite ends of the large rigid cylinder. This construction renders unnecessary the long guiding surfaces customarily employed in guiding the tool head on the frame structure, and therefore, permits of the use of a relatively short guide 46 engaging with vertical ways 46ª on the front side of the column. Thus, the tool spindle is firmly supported and guided, and at the same time, a high degree of compactness is assured. The short guide 46 is preferably formed on the top section of the gear box, at the inner end thereof, so that when the character of the tool head is to be varied by changing the bottom plate, a separate guide need not be provided. The ways 46ª extend downwardly to the base of the column, and near the base are slidably engaged with the rear edge of the work table 47 which is equipped with a supporting standard 48.

In Figs. 4 and 5, I have shown the preferred arrangement employed when a multiple tool spindle head is used. Four spindles are shown in offset relation to the axis of the ram, respectively driven from the shaft 13 by two gear trains 49 and 50. The bearings for the spindles and gears are carried solely by the bottom plate of the casing so as to be removable therewith.

The drive shaft 13 for the spindle head extends upwardly through the head portion of the column into operative relation to the power-driven mechanism which is enclosed within a casing 51 (Fig. 1) mounted on top of the column. The upper portion of this shaft is splined as indicated at 52 and engages with an elongated sleeve 53 mounted in a bushing 54 through the medium of roller thrust bearings 55 and 56. The casing 51 preferably has a cylindrical cap 57 for receiving the upper end of the shaft 13.

Rotational movement is imparted to the sleeve 53 and hence to the shaft 13 by means of a gear 58 rigid with the upper end of the sleeve 53 and forming part of a gear train driven from a parallel shaft 59. The latter has suitable bearings in the casing 51, and is driven in turn through bevel gearing 60, 61 from the shaft 62 of the motor 12.

The pump 11 is driven from the motor 12 by means of a chain and sprocket mechanism 63, and, if desired, the shaft 59 may be extended downwardly for connection with a coolant supply pump 64 enclosed within the upper portion of the column.

It will be apparent that by the construction employed, the hydraulic feed mechanism is capable of guiding the spindle head effectually while exerting a powerful downward feeding pressure directly thereon. By arranging the spindle drive mechanism to one side of the cylinder and ram, instead of extending it axially through the ram, a substantial saving in head room is obtained. Moreover, the lateral extension of the gear box toward the column of the machine for the purpose of receiving the lower end of the drive shaft 13, is utilized in providing the short additional guide 46 for the tool. Moreover, the construction is relatively simple, it being possible, by reason of the construction of the cylinder, to hone or otherwise finish the interior of the cylinder throughout the length thereof. Also the construction provides a simple but rugged support for cylinders of different sizes, and an advantageous mounting for the spindle casing permitting various types of heads to be used interchangeably.

In many instances, it is possible to change the number and arrangement of the spindles merely by substituting one bottom plate 36ᵃ of the spindle head casing for another, it being noted that the upper bearing 41 for the tool spindle (Fig. 3) is readily disengageable for this purpose. Of course, in making such a change, the substituted plate must be of the same contour as the plate removed. When a more radical change is required, the entire spindle head can be removed as a unit by removing the bolts which secure it to the flange 38 of the ram and by freeing the cap plate 45 encircling the drive shaft 13, so as to permit the downward withdrawal of the casing relative to the bearings 43 and pinion 44 on the lower end of the drive shaft 13.

I claim as my invention:

1. A machine tool comprising, in combination with a frame structure, a tool-carrying and driving head comprising a gear box having a rigid bottom plate, a short rigid tool spindle journaled in said bottom plate, hydraulic means for reciprocating said head including an elongated cylinder of large diameter rigidly mounted on said frame structure and an elongated ram of large diameter extending entirely through said cylinder and having guide bearings at opposite ends of the cylinder, means rigidly and removably fastening said gear box to one projecting end of said ram in direct engagement therewith, with the bottom plate spaced a short distance from said end of the ram, whereby said spindle is firmly supported and guided in its movements by said ram and cylinder, an additional guide on the gear box cooperating with said frame structure, and means separate from said ram for driving the tool spindle including a drive shaft mounted in said frame structure parallel to said ram, and a gear train in said box operatively connecting said spindle with said drive shaft.

2. A machine tool comprising, in combination with a frame structure, a tool-carrying and driving head comprising a gear box, hydraulic means for reciprocating said head including an elongated cylinder of large diameter rigidly mounted on said frame structure and an elongated ram of large diameter extending entirely through said cylinder and having guide bearings at opposite ends of the cylinder, one projecting end of said ram being open to form a recess of substantial depth and said gear box having a top section with a hollow extension thereon fitting snugly in said recess, means rigidly and removably fastening said gear box to said projecting end of the ram with said bottom plate spaced a short distance from the ram, a short rigid tool spindle journaled in said bottom plate and in said extension within the lower end of the ram, an additional guide on the gear box cooperating with said frame structure, and means separate from said ram for driving the tool spindle including a drive shaft mounted in said frame structure parallel to said ram and a gear train in said box operatively connecting said spindle with said drive shaft.

3. A machine tool comprising, in combination, a frame structure including a column with a forwardly projecting upper end portion having spaced parallel side walls, an elongated cylinder of large diameter having rearwardly extending members abutting and rigidly secured upon the front edges of said side walls, an elongated ram of large diameter extending entirely through said cylinder and having guide bearings at opposite ends of the cylinder, a tool-carrying and driving head comprising a gear box having a rearward extension with a guide thereon engaging said column below the upper end portion thereof, fluid pressure supply means in said column including a pump and pipe connections extending between said side walls and leading to the opposite ends of said cylinder, said gear box including a rigid bottom plate, a tool spindle journaled in said bottom plate, means rigidly and removably fastening said gear box to the lower end of the ram in direct engagement therewith, with said bottom plate spaced a short distance from the ram; and means for driving the tool spindle including a drive shaft extending parallel to said ram and disposed between said side walls, driving means for said shaft mounted on the upper end of the column, and a gear train in said gear box operatively connecting the lower end of the drive shaft with said tool spindle.

4. A machine tool comprising, in combination, with a frame structure, a tool-carrying and driving head comprising a gear box having a rigid top section and a rigid bottom plate, a short rigid tool spindle journaled in said base plate, hydraulic means for reciprocating said head including an elongated cylinder of large diameter rigidly mounted on said frame structure and an elongated ram of large diameter extending entirely through said cylinder and having guide bearings at opposite ends of the cylinder, means rigidly fastening said gear box to one projecting end of said ram with said top section directly engaging the ram and the bottom plate spaced a short distance from said projecting end of the ram, whereby said spindle is firmly supported and guided in its movements by said ram and cylinder, an additional guide on the top section of the gear box cooperating with said frame structure, and means separate from said ram for driving the tool spindle including a drive shaft mounted in said frame structure parallel to said ram and having a driving pinion thereon within the gear box, and a gear train in said box carried by the bottom plate and operatively connecting said spindle with said drive shaft, said bottom plate and gear train being removable from the ram independently of the top section of the gear box.

ALBERT M. JOHNSON.